H. A. RICH.
TIME CARD RECORD.
APPLICATION FILED NOV. 9, 1914.

1,294,535.

Patented Feb. 18, 1919.

UNITED STATES PATENT OFFICE.

HAROLD A. RICH, OF DETROIT, MICHIGAN.

TIME-CARD RECORD.

1,294,535. Specification of Letters Patent. Patented Feb. 18, 1919.

Application filed November 9, 1914. Serial No. 871,094.

*To all whom it may concern:*

Be it known that I, HAROLD A. RICH, a citizen of the United States of America, residing at Detroit, in the county of Wayne and State of Michigan, have invented certain new and useful Improvements in Time-Card Records, of which the following is a specification, reference being had therein to the accompanying drawings.

This invention relates to time cards, and the primary object of my invention is to provide a novel record card that facilitates and reduces to a minimum computations of piece work time, cost of production, and the checking of records, besides insuring a system for manufacturies that permits of time clock records being checked, lost time ascertained in a shop, and the speed or ability of artisans compared.

A further object of this invention is to provide a time card by which many records can be maintained and which eliminates inaccuracies of a clerical force, possible erasure or change of a time card, and calculations that have heretofore required considerable time with the possibility of poorly executed records being misinterpreted.

As a piece work record card, the use of a pencil upon the part of a factory or shop foreman is obviated by providing the card with tables that can be punched or otherwise apertured to indicate the month and day of the month upon which a piece of work is performed, besides indicating the time of starting and finishing the piece of work. Other tables are provided whereby the punches indicating the starting and finishing of a piece of work also permit of rapid calculations being made to determine the exact number of hours and minutes required to perform a piece of work.

As a record for determining the cost of production, provision is made whereby the time card can be identified with a particular piece of work and used in connection with an index system whereby the cost of a piece of work or completed job can be readily ascertained.

As a check to a time clock record, the time card permits of the time actually spent upon work in a factory or shop being compared with the time that a workman is on duty, thus permitting of lost or idle time of workman being ascertained with a view to increasing the efficiency of a shop or factory.

I attain the above and other objects by a time card that will be hereinafter specifically described and then claimed, and reference will now be had to the drawing, wherein—

Figure 1 is a view of the front face of a card in accordance with my invention; and Fig. 2 is a view at the reverse face thereof.

The time card is rectangular in plan and is made of a durable material to withstand considerable handling. The front face of the card has the upper portion thereof longitudinally ruled or lined and upon the lines are printed designations or data with intervening blank spaces adapted to be filled in whereby a complete record can be maintained. For instance, on the first line there is a printed abbreviation of "pieces" and it is upon this line that the number of pieces to be operated upon is marked. On the second line is printed "Operation" and "Job number", each having blank spaces whereby the number of the job can be placed upon the card and the character of the operation to be performed upon the pieces of work. On the next line provision is made for a total number of pieces at so much per hundred or lot, and on the next line provision is made for maintaining a record of defective pieces. Other lines permit of a record of names of the department foreman, stockkeeper, workman's name, his number and total of hours as indicated by the card. The printed matter, size of blank spaces and arrangement are susceptible to change as the time card can be used in connection with various manufacturies.

The lower portion of the front face of the card is divided from the upper portion thereof by a longitudinal space designated 1, and at the extreme lower edge of the card are two parallel longitudinal divided spaces 2 and 3, one containing numbers corresponding to the number of months in the year, and the other containing numbers corresponding to the number of days in a month. By punching a number in each one of these spaces it is possible to indicate a certain day of the month, for instance the 17th of September.

The spaces 1, 2 and 3 are defined by rulings or lines and the space between the spaces 1 and 2 is sub-divided into groups of columns intersected by longitudinal rulings or lines dividing each group of columns into small spaces or squares. Each group of columns is for an hour and minute record and in the first column of a group is printed or otherwise marked the working hours of the day, while in the remaining columns of the group are numbers indicating tenths of an hour. For instance, the ante-meridian indication including the working time is from six thirty (6.30) a. m. to eleven thirty (11.30) a. m., and the post meridian indication from noon to the hour of five (5.00) p. m. As shown, punches indicate that a piece of work was started on or about eight forty-two (8.42) a. m. and finished on or about three twenty-four (3.24) p. m. on the 17th day of September. As each group of columns is for a day, it is possible to punch the time required to perform a piece of work should it extend over one day, and it is in this connection, that the card may be made of such size as to cover the working hours of a week or predetermined period of time.

The lower portion of the reverse face of the card is provided with rulings or lines forming groups of columns that are intersected by longitudinally disposed parallel rulings or lines and the divisions and subdivisions upon said reverse face of the card are exactly opposite those on the front face of the card, in order that the punches or apertures will serve for indicating purposes on the reverse face of the card.

Each group of columns is provided with a table having two divisions of numerals, one for making certain calculations of ante-meridian time and the other for post meridian time, both divisions being utilized when the time extends from ante-meridian to post meridian or vice versa. By referring to the table it will be observed that the numeral 22 appears above one puncture and the numeral 84 above the other, and by mentally deducting 22 from 84 there is a resultant of 62, indicating six and two tenths (6.2) hours the exact time consumed by a workman in performing an operation started at eight forty-two (8.42) and completed at three twenty-four (3.24), the time indicated upon the front face of the card.

An example of an ante-meridian calculation is as follows:—Supposing a workman started a piece of work at six thirty (6.30) and completed the same at nine thirty (9.30), zero would appear above one puncture and the numeral 3 above the other, thereby indicating three hours as the time consumed in performing the piece of work.

As an example of post meridian time, I will assume that a piece of work is started at twelve fifty-four (12.54) and finished at two forty-two (2.42). The punctures designating this time on the front face of card pierce the numeral 29 and 87 upon the reverse face of the card and above the punctures will be found the numerals 59 and 77. Deducting the former from the latter there is a resultant of 18 indicating one and eight tenths (1.8) of an hour.

It is present practice for foreman to use a pencil in marking time upon a card and considerable time is lost by misplaced pencils, broken points, and corrections and erasures on a card. Furthermore, it is necessary for a foreman to account for the noon hour of rest or lunch, and when the cards are handed in to the time department, it is necessary for the timekeeper to calculate exactly how many hours and minutes were consumed in performing a piece of work. The timekeeper must calculate the ante-meridian time, the post meridian time and then add the two together, this calculation requiring a number of timekeepers, particularly in connection with large plants.

With my improved time card, it is only necessary for a timekeeper to observe the reverse face of the card and the time punched thereon can be easily calculated. Since the fractions of an hour are carried in tenths, it is possible to balance workman's time on an adding machine, and at the end of a specified time or pay, to balance the same with the workman's clock record or card.

Many advantages are derived by using my improved time card the most of which will be apparent to those familiar with shop practice and while I have herein described one embodiment of my invention, it is apparent that with slight modifications the time card can be used in connection with various systems.

What I claim is:

A time card comprising parallel rows of numerals on one of its faces indicating working hours and tenths of hours of a day arranged in a progressive series for any number of days of a year, a yearly calendar below said numerals arranged in parallel rows, one row to indicate the month and the other the day of the month, the other face of said card being provided with numerical indicia positioned opposite to the numerals on the opposite side thereof, so that when the hour and tenth of the hour for any day is punched out on one face of said card, the first numeral, of the difference between the numerals appearing above the punch marks on the other face of said card, will be the number of hours and the second numeral the tenths of hours employed for that day.

In testimony whereof I affix my signature in presence of two witnesses.

HAROLD A. RICH.

Witnesses:
ANNA M. DORR,
KARL H. BUTLER.